US010073967B2

(12) United States Patent
Prabhu

(10) Patent No.: US 10,073,967 B2
(45) Date of Patent: Sep. 11, 2018

(54) CONTROLLING DISTRIBUTION AND USE OF A DEVELOPER APPLICATION IN A NETWORK ENVIRONMENT

(71) Applicant: Hewlett-Packard Development Company, L.P., Houston, TX (US)

(72) Inventor: Sandeep Matti Prabhu, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/418,732

(22) PCT Filed: Oct. 23, 2012

(86) PCT No.: PCT/US2012/061479
§ 371 (c)(1),
(2) Date: Jan. 30, 2015

(87) PCT Pub. No.: WO2014/065784
PCT Pub. Date: May 1, 2014

(65) Prior Publication Data
US 2015/0310208 A1    Oct. 29, 2015

(51) Int. Cl.
*G06F 21/53*    (2013.01)
*G06F 9/445*    (2018.01)
(Continued)

(52) U.S. Cl.
CPC ............... *G06F 21/53* (2013.01); *G06F 8/60* (2013.01); *H04L 63/102* (2013.01); *H04W 4/60* (2018.02); *G06F 2221/033* (2013.01)

(58) Field of Classification Search
CPC ............ H04L 9/00; H04L 9/32–9/3297; H04L 63/04–63/0492; H04L 63/08–63/0892;
(Continued)

(56) References Cited

U.S. PATENT DOCUMENTS 8,255,991 B1    8/2012    Hackborn
8,863,267 B2 *  10/2014   Selitser ............... G06F 21/6218
                                                370/401
(Continued)

FOREIGN PATENT DOCUMENTS

CN    1613062    5/2005
CN    1979512    6/2007
(Continued)

OTHER PUBLICATIONS

International Search Report & Written Opinion received in PCT Application No. PCT/US2012/061479, dated Jul. 15, 2013, 14 pages.
(Continued)

*Primary Examiner* — Ashok Patel
*Assistant Examiner* — Quazi Farooqui
(74) *Attorney, Agent, or Firm* — HP Inc. Patent Department

(57) ABSTRACT

A method is disclosed for controlling distribution and use of a developer application in a network environment. A portal is provided for a developer to submit the developer application for use in the network environment. The developer application is operated for network devices that request use of the developer application. The developer application is operated to generate an output for individual network devices that request use of the developer application. The developer application is prevented from being operated on any of the individual network devices to access a service that is not part of a predetermined set of specified services that are allowed for that developer application.

15 Claims, 4 Drawing Sheets

(51) Int. Cl.
  *G06F 8/60* (2018.01)
  *H04L 29/06* (2006.01)
  *H04W 4/60* (2018.01)

(58) Field of Classification Search
  CPC ............... H04L 63/102; G06F 15/16; G06F 21/30–21/46; G06F 21/60–21/645; G06F 9/00; G06F 21/53; G06F 8/60; G06F 2221/033; G06F 9/445; H04W 4/003; H04W 4/60
  USPC ............ 713/153, 168–176, 182–186, 202; 726/1–33; 382/115; 709/206, 225, 229, 709/249, 389
  See application file for complete search history.

(56) References Cited

U.S. PATENT DOCUMENTS

| | | | |
|---|---|---|---|
| 2003/0051169 | A1 | 3/2003 | Sprigg |
| 2006/0053290 | A1 | 3/2006 | Randle et al. |
| 2007/0050493 | A1 | 3/2007 | Sienel et al. |
| 2008/0228513 | A1* | 9/2008 | McMillan ............ G06F 21/105 705/1.1 |
| 2009/0007269 | A1* | 1/2009 | Bianco .................. H04L 63/20 726/25 |
| 2009/0248695 | A1 | 10/2009 | Ozzie |
| 2010/0251328 | A1 | 9/2010 | Syed et al. |
| 2010/0274826 | A1* | 10/2010 | Takata .................. G06F 3/0605 707/812 |
| 2012/0011573 | A1* | 1/2012 | Menasce ................ G06F 21/40 726/4 |
| 2012/0036552 | A1 | 2/2012 | Dare et al. |
| 2012/0117626 | A1 | 5/2012 | Yates et al. |
| 2012/0194851 | A1* | 8/2012 | Srinivasmurthy .... G06F 3/1204 358/1.15 |
| 2012/0203618 | A1 | 8/2012 | Roever |
| 2012/0204251 | A1 | 8/2012 | Kopti |

FOREIGN PATENT DOCUMENTS

| | | |
|---|---|---|
| CN | 102024122 | 4/2011 |
| EP | 2163986 | 3/2010 |
| WO | WO-2010048097 A2 | 4/2010 |

OTHER PUBLICATIONS

NETSUITE, "NetSuite The Benefits of Running Your Business Software in the Cloud: Strategies for Success," (Research Paper), Feb. 10, 2011, 15 pages, available at http://www.bcgsystems.com/the-benefits-of-running-your-business-software-in-the-cloud/.

European Patent Application 12887245.4, extended European Search Report dated Apr. 22, 2016, 9 pages.

* cited by examiner

CONTROLLING DISTRIBUTION AND USE OF A DEVELOPER APPLICATION IN A NETWORK ENVIRONMENT

BACKGROUND OF THE INVENTION

Web-enabled printers exist that connect to different networks and have access to the Internet. In some cases, users of the web-enabled printers can operate a control panel to print content received from the Internet.

DETAILED DESCRIPTION

Figure 1:
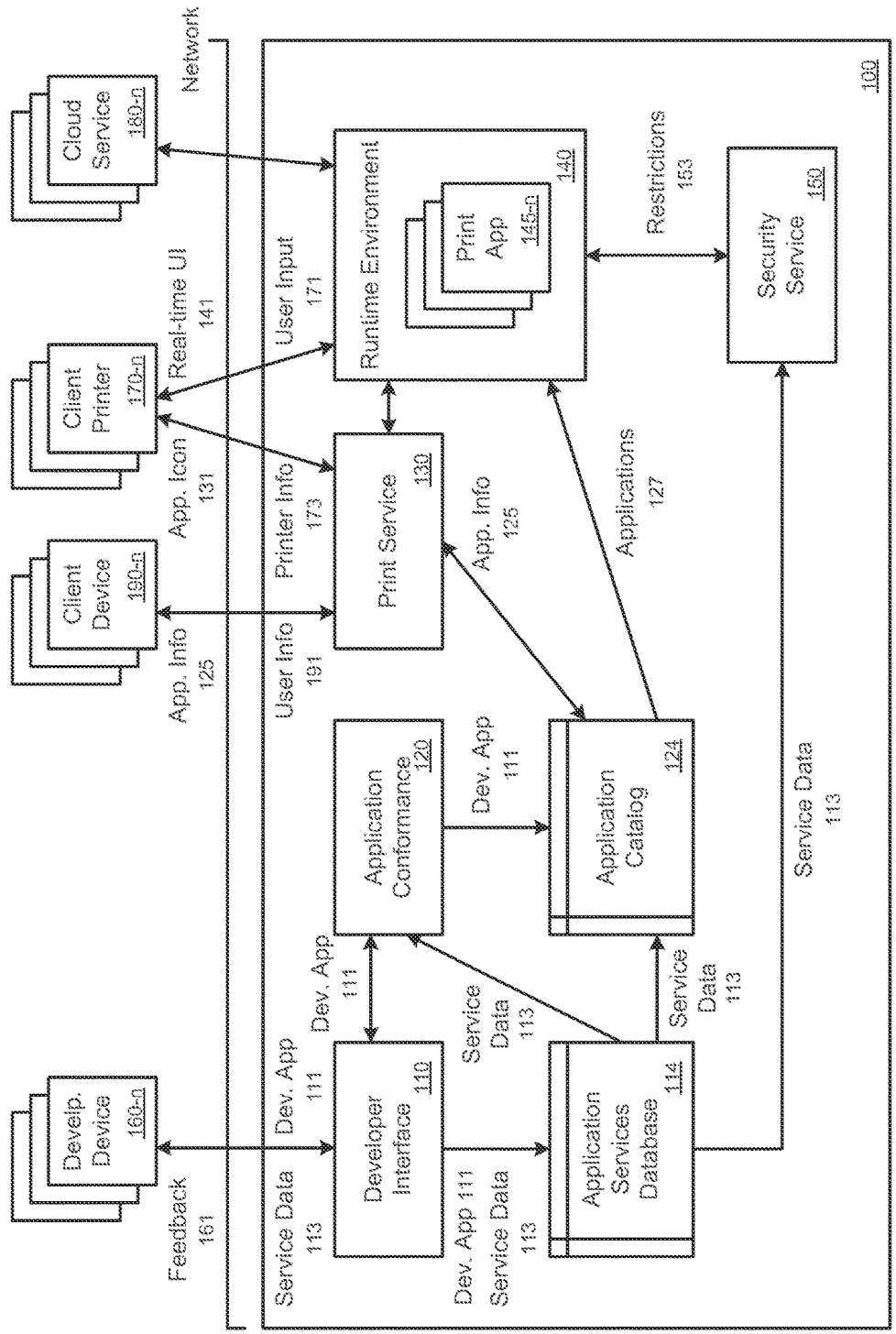
FIG. 1 illustrates an example system for managing applications, under an embodiment.

Embodiments described herein provide for a system and method to enable application developers to effectively provide applications to an application catalog while providing a secure application environment to ensure that applications are not misbehaving. In some implementations, by monitoring applications that are being run in a runtime environment, the system can prevent one or more applications from accessing unauthorized network services and/or unauthorized client device services during application run-time.

According to examples described herein, one or more applications can be run in a runtime environment using one or more system resources. The one or more applications can be operated or controlled remotely (from the system) by a user at a network device, such as a network-enabled printer. While the application is running, the system can determine whether the application attempts to access an unauthorized network service and/or an unauthorized device service that the application does not have access to. If it is determined that the application attempts to access unauthorized service(s), the system can prevent the application from accessing the unauthorized service(s).

In one example, a portal for a developer is provided. The portal enables a developer to submit a developer application for use in the network environment. The application can be operated for network devices that request use of the developer application. The developer application is operated to generate an output (e.g., user interface features) for individual network devices that request use of the developer application. The developer application can be prevented from being operated on a network device to access a service that is not part of a predetermined set of specified services that are allowed for that developer application.

In some embodiments, applications and information about the applications, such as network services and/or device services that a respective application will access during its operation, can be stored in one or more databases. The databases can be referenced to determine what predetermined set of services the application is authorized to access and what set of services the application is not authorized to access. By referencing or using the databases during run-time, when an application makes a function call to access a service, the system can control the runtime environment to either allow the function call to be made or prevent the function call to be made to the requested service.

Still further, the system enables application developers to submit applications to an application catalog, so that a user can select and install one or more applications to a client device. The developers can be required to identify a set of services (e.g., one or more network services and/or one or more device services) that his or her application will have access to during its operation at one time or another. For example, the developer can be prompted to provide the service information in order to submit the application to the system. Based on the identified service(s), a conformance process can be performed to review the application before the application can be uploaded or deployed to the application catalog.

In other embodiments, an application catalog can be provided to a user's client device to enable the user to view the various available applications and the respective services that will be accessed by the applications. For example, in this manner, the user can be provided with relevant information about the services that an application will access before the user chooses to select and install the application on his or her network-enabled printer. In some variations, the application developer can redefine or alter the service(s) that his or her application will use to update the information in the application services database and the application catalog.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for managing applications, under an embodiment. A system 100, such as described by an example of FIG. 1, can be implemented in a variety of computing environments. For example, system 100 can be implemented through a combination of servers or other network-enabled computing devices. In other variations, system 100 can be implemented on other computing platforms, including stand-alone systems. As an alternative or addition, some or all of the components of system 100 can be implemented on client devices, such as through applications that operate on user terminals. Accordingly, system 100 can be implemented as a network service that can enable application developers to submit applications to an application catalog, and manage applications that are run on system 100 to ensure that the applications behave properly.

System 100 can communicate over a network, via a network interface (e.g., wirelessly or using a wireline), to communicate with one or more developer devices 160, one or more client printers 170, one or more network (cloud) services 180, and one or more client devices 190. In one implementation, system 100 can be provided as a service that is operable to communicate with the described devices and services in order to provide cloud printing services (e.g., printing services that are provided using cloud resources). As described herein, developer devices, client devices, and/or client printers can include mobile computing devices, personal computers, tablet devices, network-enabled printers, etc.

In some implementations, system 100 includes a developer interface 110, application services database 114, application conformance 120, and application catalog 124. The developer interface 110 (or portal) enables application developers to use developer devices 160 to submit applications that the developers have created to system 100 for review and for uploading to the application catalog 124. Applications can include print applications that can be accessed or operated by a user using a client printer 170. A print application can provide the user with a shortcut to print content from the Internet directly to the client printer 170 without having to retrieve content using a separate computing device (e.g., such as a PC).

The developer interface 110 can provide a means for an application developer, e.g., via a web page or presentation, to submit his or her application 111 to system 100. Once an application is made available to users, a user can install the application (e.g., an icon of the application, and a pointer, such as a link) for use on his or her respective device. For example, the developer interface 110 can enable the application developer to register with system 100, log in, develop applications, submit the application, provide information about the application (e.g., images, what the application does, how much it costs, etc.), and specify services that the application will access during application.

Because the developer has knowledge of what services the application needs access to, the developer can also specify what type of services the application will access during its operation (e.g., service data 113). The developer can identify a set of specified services for his or her application by using the developer interface 110 (e.g., the developer portal). In some implementations, the application developer can define access specifiers (e.g., identifications for the different services) for the application during or after development of the application. In one example, the developer interface 110 can prompt the developer to provide service data 113 before the developer is allowed to upload or submit the application 111 to system 100. The developer interface 110 can also provide feedback 161, via the web page or presentation, to inform the developer of any problems or additional necessary information during the application submission process.

During operation, applications can access a variety of different network services 180 (e.g., services on the cloud or other network resources) and/or device services based on the design, purpose, or implementation of the individual applications. Because the developer interface 110 can require application developers to identify a set of services that the application 111 will access, system 100 can have knowledge of which services are authorized for each submitted application. In this manner, identified services can be authorized so that access can be granted if an identified service is requested by an application, while services that a developer has not specified can be unauthorized so that access can be denied if the unauthorized service is requested by an application.

In some examples, network services 180 that an application can access on the cloud can include (i) email service (or messaging service)—if the application will be able to send or receive emails using an email service on the cloud; (ii) personalization service—if the application will store any of the user's personalized information (such as user preferences or email information, etc.); (iii) externally hosted content—if the application needs to access externally hosted content for printing (e.g., RSS feeds, etc.); or (iv) e-commerce services (or transaction service)—if the application will allow financial transactions, such as purchases from inside the application. Other network services can also be identified by the developer.

The service data 113 that the developer identifies for his or her application 111 can also include device-specific services. In implementations where the application 111 is a print application, the device services that the application can access can include (i) print service—if the application will use the printing capabilities of the printer; (ii) scanner service—if the application will use the device's scanner; (iii) fax service—if the application will use the facsimile capabilities of the device; (iv) memory storage—if the application will read/write from/to the storage devices (internal or external) of the printer; (v) ink level information—if the application can retrieve information about current levels of ink on the printer; (vi) cartridge information—if the application can retrieve information about the cartridge (e.g., cartridge type, whether the cartridge is original or counterfeit); (vii) scheduled printing service—if the application can deliver content according to a schedule (daily, weekly, etc.) without user action; (viii) security service—if the application can impose password restrictions or security to be enabled on the printer (e.g., ensure that proper log in or identification is provided to make sure unauthorized users cannot use the application or printer); or (ix) other printer services—if the application can use other features of the printer, such as lights or sounds, or information about the amount of paper in a paper tray. By specifying the services necessary, the service data 113 can define the maximum set of services that will be accessed by the application during run-time. This service data 113 can then be used by the security service 150 to restrict the application privileges on the cloud as well as on the printer during run-time.

After the developer submits the application 111 and specifies the application's privileges (e.g., the set of specified services) to the developer interface 110, the developer interface 110 can store the service data 113 in the application services database 114. The application services database(s) 114 can store records or entries of applications that have been submitted by developers (or other entities) with the corresponding service data 113, which identify the network service(s) and device service(s) the application will have access to (e.g., is authorized to use). In some implementations, a developer can interact with the developer interface 110 to redefine or update/alter the service data 113 for his or her application (e.g., if the developer makes changes to the application). Changes to the service data 113 can be stored in the application services database 114.

As an addition or alternative, system 100 can enable other network services and/or other device services to be accessed by an application. This can be a result of, for example, additional services that are available or necessary that were not previously available for a developer to use with his or her application. System 100 (e.g., via the print service 130, etc.) can enable the one or more additional services to be automatically included in a set of specified services identified by the developer. In this manner, the application can have access to system 100 services, device services, and/or network services that the application previously had no privilege to access. In other variations, a user of an application can also manage (e.g., add or delete, or temporarily prevent, etc.) the set of specified services for an application (that he or she has installed) from his or her client device 190 or client printer 170. For example, the user may remove a scanner service from the predetermined set of specified services for a particular application to prevent the application from being able to use the scanner functionality of the user's printer.

Once the developer submits the application 111, the application 111 is provided to the application conformance 120 for review before the application 111 can be uploaded or added to the application catalog 124. Depending on various implementations, the application conformance 120 can perform the tiered application conformance process automatically, manually, or both automatically and manually. Due to the growing popularity of applications and increasing number of public application developers, applications can saturate the application environment. The application conformance 120 can be used to police the applications that are submitted to the application environment (e.g., secure the application environment) and provide a quick turnaround time to upload an application to the application catalog if possible.

The application conformance 120 can perform an application conformance process based on the identified services of each application. The application conformance 120 can retrieve the service data 113 for a particular application 111 that has been submitted, and based on the total number of specified service(s) that the application 111 will have access to during its operation, the types of specified service(s), and/or the importance of the specified service(s), different conformance processes can be performed to review the submitted application 111.

In some implementations, the application conformance 120 can use a tiered process so that applications will be subject to different conformance reviews based on the total number of service(s) the application will access. For example, a first application that accesses more network services and/or more device services than a second application can be subject to a stricter application conformance process than the second application. In some cases, predetermined threshold values can be used to determine the tiers or rankings (e.g., seven or more services=highest tier; three to six services=middle tier; two or less=lower tier). In another example, an application that accesses a particular network service that is flagged or deemed to be more important or more intrusive (than one or more other services) can be subject to a stricter application conformance process than an application that does not access such a network service.

In some variations, network service(s) and/or device service(s) can be categorized on importance based on functionality and/or service. For example, an e-commerce service can be categorized in a high security category (e.g., because purchases can be made by using the application, thereby potentially exposing the user's financial information), whereas a service to determine ink levels of a user's printer can be categorized in a low security category.

In one implementation, high security categorized services can be applied a weighted value (e.g., a multiplier such as 3×) as compared to medium security categorized services (e.g., a multiplier such as 2× or 1.5×), so that the application conformance 120 can determine a value by summing up a total number of services (that is also weighted) for a particular application. The application conformance 120 can then determine the tiers based on the range where the summed value lies in. For example, if there are twenty total services, with ten services having no applied weights, five services having a weight of 2× multiplier, and five services having a weight of 3×, the maximum value can be 35. The tiers can be determined so that the range for a first tier can be from 0 to 8, the range for a second tier can be from 9 to 17, the range for a third tier can be 18 to 30, and the range for a fourth tier can be 31 or higher. In one example, the application conformance 120 can cause applications that are in the first tier (e.g., based on their identified service data 113) to be subject to the most relaxed conformance review (or be automatically approved and submitted to the application catalog 124 without being review), while subjecting applications that are in the fourth tier to the most strict conformance review. In this manner, applications that a developer has specified as using a high number of services and/or services that are of high importance can be subject to a stricter conformance review, as compared to applications that a developer has specified as using a small number of services and/or services that are of low importance.

After determining which level or strictness conformance process to use to review a submitted application, the application conformance 120 can perform the respective conformance review. The conformance reviews can be performed automatically, manually, or both automatically and manually. In some implementations, system 100 can be accessed by administrative system users that can perform the different conformance reviews manually (e.g., by examining application information provided by a developer such as the description, the images, the application code, etc.). In other variations, each of the different conformance reviews can be performed automatically by checking the submitted applications' code for the existence of particular objects (e.g., by referencing a database identifying which objects are flagged for importance or suspicion) and/or by using criteria to determine whether the submitted applications' are missing necessities (e.g., the application catalog 124 can require certain features in order for an application to be allowed for users to install). In some situations, the reviews can also require administrative system users' input in order to perform the review.

After the applications are reviewed, the application conformance 120 can upload or provide the developed application 111 (e.g., that has passed the conformance review) to the application catalog 124. The application catalog 124 can store a plurality of different applications submitted by various developers and other entities, and include the service data 113 of each of the applications. The application catalog 124 can also store other information corresponding to the applications, such as preview images, description of the application, application create date and/or upload date, etc.

In this manner, certain applications can have a quicker turnaround time to upload the application to the catalog as compared to other applications. By using a tiered application conformance process, application developers can also be encouraged to identify only those services that are specifically required for the application functionality. In addition, by managing applications to use only services that are specifically necessary to function properly, the network usage of system 100 can be reduced.

System 100 also includes a print service 130, a runtime environment(s) 140, and a security service 150. Users can operate their client devices 190 to access the print service 130 of system 100. The print service 130 can use the application information 125 from the application catalog 124 to provide a web page or presentation of the application catalog 124. The presentation, for example, can be presented to the user's client device 190 to enable a user to view the different available applications and associated information. By providing application information 125 of the applications 111, the corresponding service data 113 (e.g., identified services that the application will access during operation), and other application information on the presentation, users can access the application catalog 124 to browse available applications and specifically view the services that each application has been identified to use. In this manner, the user can be fully aware of what services that an application will use if he or she chooses to install the application on his or her client printer 170.

Each user can operate a client device 190 to create a user account by providing user info 191 (e.g., user identification, password, profile, etc.) and by registering one or more client printers 170 with the print service 130. The user can register his or her printer(s) 170 by providing printer information to the print service 180. The printer information can include an address for the printer (e.g., an IP address, or a registered printer email address, type of printer the printer is (e.g., color printer, laser printer, ink-jet printer, etc.), specification of the printer (e.g., hardware, memory size, screen size, etc.), or other information about the printer (e.g., the services it has or can perform). The printer information of each printer 170 that is registered with the print service 130 can be stored in a printer database and/or user database (not shown) with a printer identifier of each printer 170. Registering the printer 170 with the print service 130 enables the user to access the application catalog 124 to browse and install one or more applications to his or her registered printer(s) 170 and/or to his or her client device 190.

When a user selects an application to be installed on his or her client printer 170, the print service 130 can cause application icon information 131 to be provided and installed to the user's printer 170. The print service 130 can access the printer database and/or the user database to identify which client printer 170 to provide the application icon information 131. The application icon information 131 can be used to enable the user to initiate and control the installed application on the client printer 170. The application icon information 131 can include, for example, a graphic of the application to be installed and a pointer, such as a uniform resource locator (URL), and/or other metadata. Because system 100 runs the applications 145 in a runtime environment 140 (or multiple runtime environments) (e.g., runs the application on the cloud), only the application icon information 131 is necessary to be provided to the client printer 170. The application is not run natively on the client printer 170. The user can interact with a touch-sensitive display or control panel of the client printer 170 to launch the application (e.g., by selecting the application graphic), and cause the runtime environment 140 to run the selected application.

In one implementation, when the user operates the client printer 170 and initiates an application, the printer 170 can provide printer information 173 (e.g., an address or printer identifier) to the print service 130 so that the print service 130 can identify which printer 170 requested to operate the selected application. In addition, a pointer to the application can be accessed so that the print service 130 can identify which application the user has requested to operate. An interface channel can then be accessed between the client printer 170 and the runtime environment 140, which runs the selected application 145, so that real-time user interface (UI) features 141 can be provided to the client printer 170 in response to different user inputs 171 on the client printer 170. For example, because the application is not run natively on the client printer 170, the runtime environment 140 can transfer UI features 141 to a thin client on the client printer 170 during the application usage or operation. The runtime environment 140 can have access 127 to applications that are stored in the application catalog 124, so that the runtime environment 140 can run selected applications 145 and transfer the appropriate UI features 141 to the appropriate printers 170.

A runtime environment 140 (e.g., an application container) can support the execution and operation of applications 145 on system 100. In some implementations, the runtime environment 140 provides a mechanism for an application 145 that is currently running (or in use) to access one or more device services (e.g., device services on the client printer 170) and/or to access one or more external services, such as network services 180. A runtime environment 140, as described in FIG. 1, can concurrently run a plurality of applications 145 for different users and users' client printers 170. When an operating application 145 attempts to access a network service 180 and/or a printer device service (of the printer 170 that initiated the application 145), the application 145 can make a function call for that service (e.g., access a memory storage of the printer 170). Because the application 145 is run in the runtime environment 140, the runtime environment 140 can make the call on the application's behalf.

The security service 150 can monitor the runtime environment 140 (or multiple runtime environments 140) to determine whether applications 145 that are running in the runtime environment 140 are requesting access to unauthorized network services and/or unauthorized device services (e.g., by performing run-time checks). The security service 150 can access the application services database 114 to identify the service data 113 for each of the applications 145 that are running in the runtime environment 140. In this manner, the security service 150 can determine which services each application has access to (e.g., is authorized to access as a result of the developer identifying the specific services) in order to enforce any calls that are made by the application(s) 145 (and in turn, made by the runtime environment 140 on behalf of the application). The security service 150 can impose restrictions 153 on the application 145 to prevent certain calls from being made if it is determined that an application is requesting access to unauthorized services.

If an application 145 makes a call for a service that has not been specified as a service it can access (and the runtime environment 140 makes the call on the application's behalf), the security service 150 can control the runtime environment 140 to prevent such calls to unauthorized/unidentified services from being made (e.g., to the client printer 170 for device services or to the cloud services 180). In one implementation, the security service 150 can also prevent answers or responses to the unauthorized call (from the device and/or cloud services) from being received by the application 145. For example, the security service 150 can handle restricting access to printer device services (e.g., ink level information or cartridge information) by limiting the application programming interface (API) calls that can be made from the runtime environment 140 to the client printer 170. On the other hand, calls that are being made to services that have been identified as authorized services can be granted by the security service 150. In some variations, the security service 150 can be a part of or be included with the runtime environment 140. In this manner, the security service 150 can prevent rogue applications (e.g., applications that are accessing services that they do not have access to) from affecting the application environment of system 100.

In some variations, some of the components that are described in system 100 can be provided as being individual components or as being part of the same component. Logic can be implemented with various applications (e.g., software) and/or with hardware of a computer system that implements system 100.

Methodology

Figure 2:
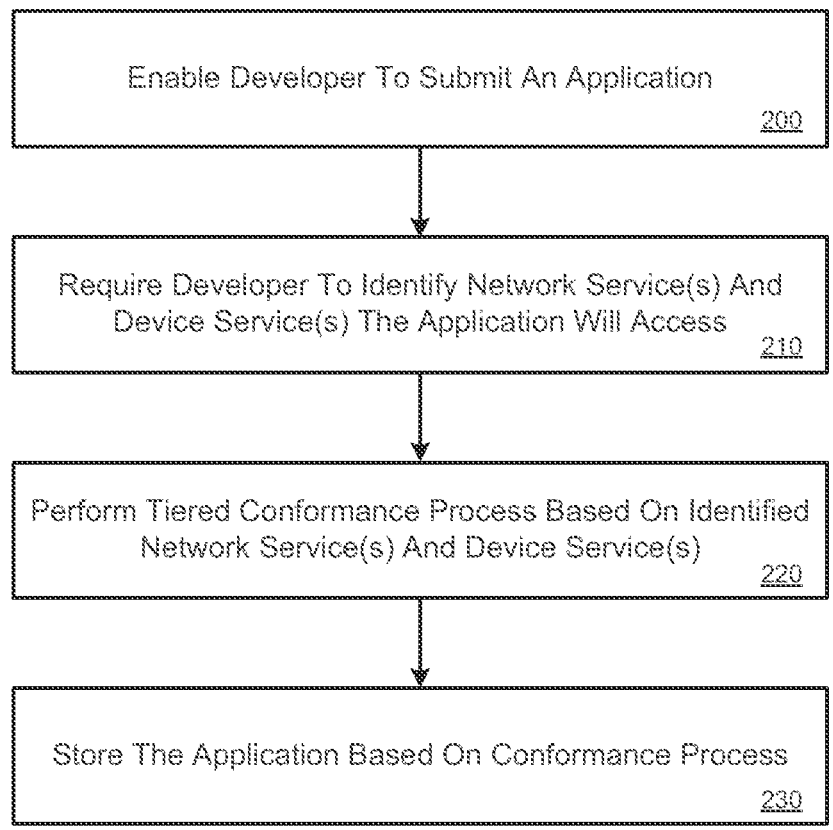
FIG. 2 illustrates an example method for enabling a developer to provide an application to an application environment, according to an embodiment.

FIG. 2 illustrates an example method for enabling a developer to provide an application to an application environment, according to an implementation. A method such as described by FIG. 2 can be implemented using, for example, components described with FIG. 1. Accordingly, references made to elements of FIG. 1 are for purposes of illustrating a suitable element or component for performing a step or sub-step being described.

An application developer can create and develop applications, such as a print application that a user can operate on the user's printer, and submit the application(s) via a developer portal or interface 100 (step 200). For example, a developer can create an application that enables greeting cards to be selected and printed from the user's printer. The developer interface 100 can provide a webpage or presentation to enable the developer to submit his or her application, with other appropriate information required for the application environment (e.g., screenshot images that are to be shown on the application catalog, brief description of the application, cost for purchasing the application, licensing agreements, etc.).

The developer can also be required to identify one or more network services and/or one or more device services that the submitted application will access during its operation (step 210). In some implementations, the developer interface can require the developer to provide information about the services the application will access before the developer can continue with the application submission process. This can ensure that each application can have an associated authorized set of network service(s) and/or device service(s) that the application is privileged to access.

For example, referring to the greeting cards application example, the application developer can specify that network service(s) that the greeting cards application will access includes externally hosted content (e.g., a cloud service/storage of different greeting card templates). The developer can also specify that printer device service(s) that the greeting cards application will access includes the print service (e.g., to enable the user to directly print a selected greeting card from the printer), ink level information and cartridge information (e.g., the application can notify the user if color ink levels are insufficient for completing the print request for a colored greeting card). The identified network service(s) and/or device service(s) can then be stored in one or more application service databases 114. The application service database 114 can be referenced by the applicant conformance 120 and the security service 150, such as described with FIG. 1.

Once the developer has submitted the application and identified the respective service(s) the application will access during operation, a tiered conformance process can be performed based on the identified services (step 220). The application conformance 120 can reference the application service database(s) to identify which service(s) the submitted application will be accessing during its operation. Based on the total number of services identified, the types of services identified, and/or the importance of the services identified, the application conformance 120 can subject the application to different tiered conformance reviews.

For example, the application conformance 120 can determine that only three services (e.g., out of a total of twenty or thirty, etc.) have been specified by the application developer for the greetings card application. In addition, the three services are not intrusive to the user or system 100 because no personalized data, financial data, or system resources, for example, will be accessed by the application. Based on the identified services, the application conformance 120 can perform a relaxed conformance review (e.g., the least stringent review) with the least amount of required criteria and conditions.

The application can then be uploaded or stored in the application catalog based on the conformance process (step 230). Depending on the type of conformance review applications have been subject to, applications can be made available to users (via the application catalog) at different times. Typically, if an application is subject to a stricter conformance review, the amount of time it takes for the application to be approved and uploaded will be generally longer than an application that is subject to a less stringent conformance review. In some implementations, the applications can be uploaded to the application catalog with information identifying to users if an application has been subject to a stricter review and that the application has been approved for user usage. This can provide the user with full disclosure of the quality of the application.

In this manner, system 100 enables application developers to effectively (and sometime quickly) develop and submit their applications to system 100 for consumer usage. In addition, the collected application information can be used for providing a secure application environment and to protect against rogue applications from accessing unauthorized resources and services.

Figure 3:
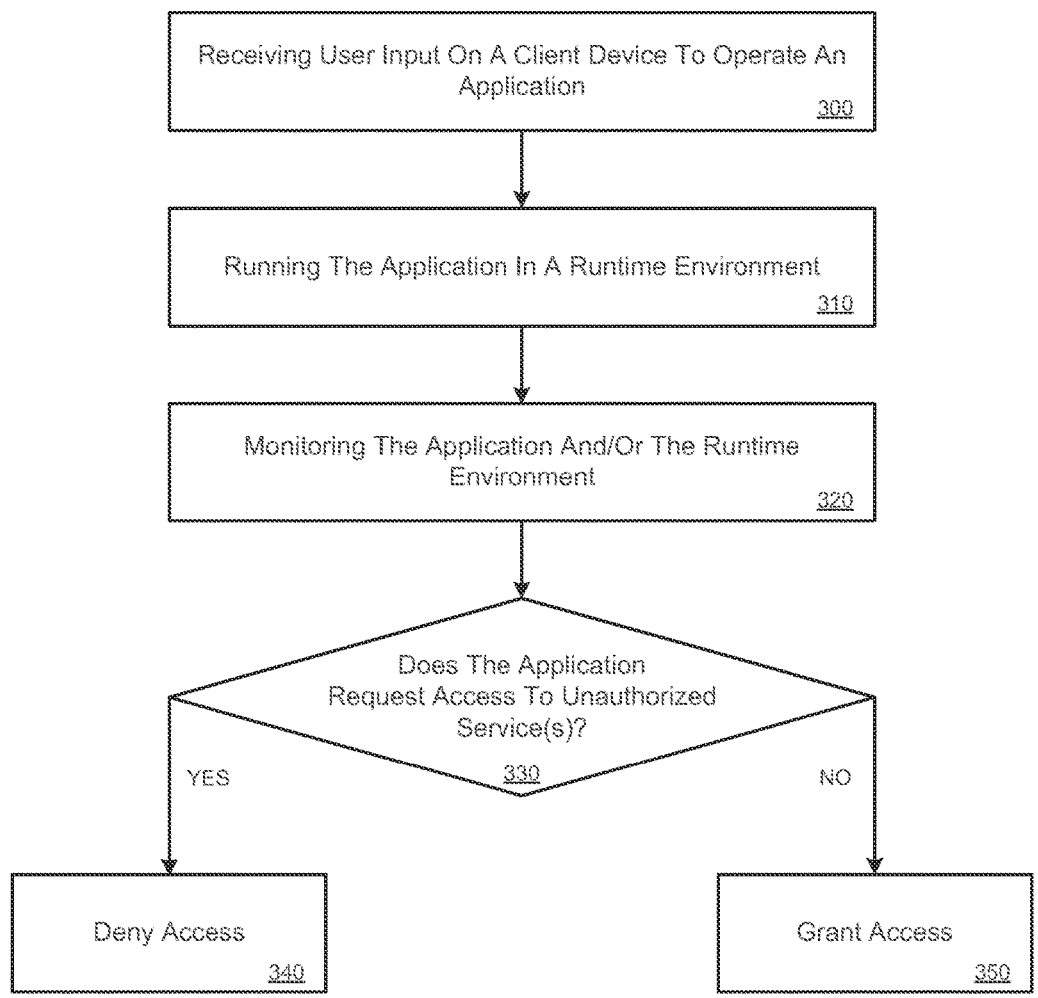
FIG. 3 illustrates an example method for managing applications, under an embodiment.

FIG. 3 illustrates an example method for managing applications, under an embodiment. A method such as described by FIG. 2 can be implemented using, for example, components described with FIG. 1. Accordingly, references made to elements of FIG. 1 are for purposes of illustrating a suitable element or component for performing a step or sub-step being described.

A user's network-enabled printer can include (e.g., as a default) a plurality of applications that the user can operate and control on the printer. Users can also access an application catalog to browse and install additional applications to their printers. For example, print applications can include applications that print documents from an external network source or service (e.g., such as a cloud storage or email service), or applications for printing movie tickets, coloring books, or other content, such as calendars and crossword puzzles. When a user selects an application to install, the print service 130, for example, can transmit application data, such as icon information and a pointer for the application to the user's printer, to be installed to the printer. Using the printer's touch-sensitive display, control panel, or other input mechanism and display, the user can initiate an application on the printer by selecting the appropriate graphic icon (step 300).

When the user initiates or launches the selected application on the printer, information about the user's selection is provided to system 100 (e.g., using the pointer, such as a URL, of the selected application) over the network. The selected application can then be run in a runtime environment on system 100 (step 310). When the user provides a user input by interacting with a UI feature of the application on the printer, information about the user's selection is provided to the runtime environment 140 and appropriate UI is then transmitted to the printer in real-time during the application usage.

While the application is running on the runtime environment 140, the security service can monitor the application and/or the runtime environment 140 to determine what services the application is requesting to access (step 320). For example, because the runtime environment 140 can make function call to network services and/or device services (e.g., make an API call to a device service or functionality) on the application's behalf, the security service can identify what calls are being requested by a particular application. In addition, the security service can reference the application services database to determine what type of services the application is authorized to access.

By monitoring the application and/or the runtime environment 140 and by referencing the application services database, the security service can determine whether the application that is being operated is requesting access to one or more unauthorized services (step 330). The security service can determine which services each application has access to, and whether the application is requesting access to a service that is not in the set of services that the application has access to. The security service can enforce any calls that are made by the applications by controlling the calls that are made by the runtime environment 140 on behalf of the applications. If an application requests access to an unauthorized service, the security service can deny access by imposing restrictions on the application (step 340). For example, calls to unauthorized services can be prevented by controlling the runtime environment 140. If an application requests access to an authorized service, the security service can grant access to the application.

Hardware Diagram

Figure 4:
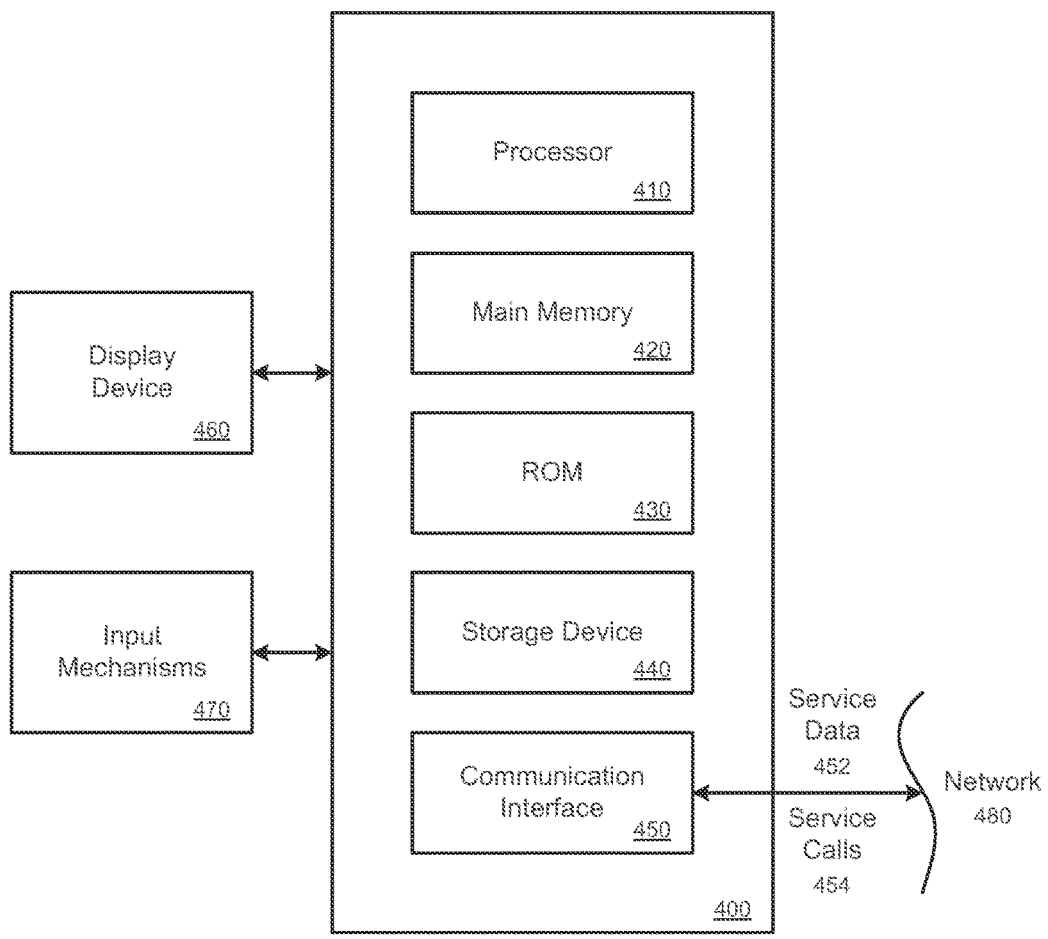
FIG. 4 is a block diagram that illustrates a computer system upon which embodiments described herein may be implemented.

FIG. 4 is a block diagram that illustrates a computer system upon which examples described herein may be implemented. For example, in the context of FIG. 1, system 100 may be implemented using a computer system (or a combination of computer systems) such as described by FIG. 4.

In one implementation, computer system 400 includes processor 410, main memory 420, ROM 430, storage device 440, and communication interface 450. Computer system 400 includes at least one processor 410 for processing information. Computer system 400 also includes a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions.

The communication interface 450 may enable the computer system 400 to communicate with one or more networks 480 through use of the network link (wireless or wireline). Using the network link, the computer system 400 can communicate with one or more client devices, one or more developer devices, one or more cloud services, and one or more network-enabled printers. In some examples, the computer system 400 can receive, via the network link, application information submitted by one or more developers, including service data 452, which identifies network services and/or device services that the developed application has access to. Application information can be stored in, for example, the storage device 440. When an application is run on computer system 400, the application can be monitored so that service calls 454 can be made to the requested network service and/or device services that the application has access to. On the other hand, service calls 454 can be prevented from being made if the application requests access to unauthorized services.

Computer system 400 can include a display device 460, such as a cathode ray tube (CRT), a LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460. While only one input mechanism 470 is depicted in FIG. 4, embodiments may include any number of input mechanisms 470 coupled to computer system 400. In some examples, authorized users of computer system 400 can use the input mechanism 470 and the display device 460 to review a submitted application by a developer in order to determine whether the application can be provided to the application catalog.

Embodiments described herein are related to the use of computer system 400 for implementing the techniques described herein. According to one embodiment, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative embodiments, hard-wired circuitry may be used in place of or in combination with software instructions to implement embodiments described herein. Thus, embodiments described are not limited to any specific combination of hardware circuitry and software.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method being performed by one or more hardware processors and comprising:
   providing a portal for a developer to submit an application for review before being approved to be uploaded to an application catalog for use in a network;
   in response to receipt of the application submitted by the developer via the portal and prior to the application being reviewed, requiring the developer to identify specific network services that the application will access during operation of the application;
   based on the network services identified by the developer, determining a total number of network services that the application will access during the operation of the application;
   comparing the total number of network services that the application will access during the operation to a threshold number to determine whether to perform a strict or relaxed conformance reviewing process of the application, wherein the conformance reviewing process is a process to determine whether the application meets certain criteria to be approved to be uploaded to the application catalog for use in the network, and wherein the relaxed conformance reviewing process is a process that allows the application to be approved faster than the strict conformance reviewing process by requiring the application to go through less criteria checking steps than the strict conformance reviewing process; and
   performing the relaxed conformance reviewing process or the strict conformance reviewing process of the application based on a result of the comparison.

2. The method of claim 1, further comprising:
   preventing the application from accessing a network service that is not part of the network services identified by the developer, wherein preventing the application includes (i) identifying the network services for the application from a database, and (ii) determining that the application attempts to access a network service that is not one of the network services for the application from the database.

3. The method of claim 1, further comprising:
   after the application has been uploaded to the application catalog, providing the application catalog to enable a user to browse and install, on a network device, the application submitted by the developer, wherein the application catalog enables the user to view the network services that the application will access during the operation of the application.

4. The method of claim 2, wherein preventing the application includes (i) preventing function calls, for a service that is not part of the network services identified by the developer, from being made by the application to individual network devices, or (ii) preventing the individual network devices to respond to the function calls for the service that is not part the network services.

5. The method of claim 1, wherein the network services include at least one of email service, personalization service, externally hosted content, or transaction service.

6. The method of claim 1, wherein the network services identified by the developer include at least one of a print capability, a scanner capability, facsimile capability, memory storage, ink level information, cartridge information, scheduled printing capability, or security service.

7. A system comprising:
   one or more hardware processors; and
   memory resources storing instructions that when executed by the one or more hardware processors cause the system to:
      in response to receipt of an application submitted by an application developer and prior to the application being reviewed to be approved and uploaded to an application catalog for use in a network, require the application developer to identify specific network services that the application will access during operation of the application;
      based on the network services identified by the application developer, determine a total number of network services that the application will access during the operation of the application;
      compare the total number of network services that the application will access during the operation to a threshold number to determine whether to perform a strict or relaxed conformance reviewing process of the application, wherein the conformance reviewing process is a process to determine whether the application meets certain criteria to be approved to be uploaded to the application catalog, and wherein the relaxed conformance reviewing process is a process that allows the application to be approved faster than the strict conformance reviewing process by requiring the application to go through less criteria checking steps than the strict conformance reviewing process;
      based on a result of the strict or relaxed conformance reviewing process, provide the approved application to the application catalog for access by network devices.

8. The system of claim 7, further comprising a database to store the identified network services with the application.

9. The system of claim 7, wherein the instructions are to cause the one or more hardware processors to enable a user to browse the application catalog and install, on a network device, the application submitted by the developer, wherein the application catalog enables the user to view the network services that the application has access to.

10. The system of claim 9, wherein the network device is a network-enabled printer, and wherein the network services include at least one of a print capability, a scanner capability, facsimile capability, memory storage, ink level information, cartridge information, scheduled printing capability, or security service.

11. The system of claim 7, wherein the network services include at least one of email service, personalization service, externally hosted content, or transaction service.

12. A computer system for controlling use of applications, the computer system comprising:
   one or more hardware processors; and
   a memory;
   wherein the one or more hardware processors use instructions stored in the memory to:
      in response to receipt of an application submitted by a developer and prior to the application being reviewed to be approved for use in a network, require the developer to identify a specific set of services that the application will access during operation of the application;
      based on the set of services identified by the developer, determine a total number of services that the application will access during the operation of the application as identified by the developer;
      compare the total number of services that the application will access during the operation to a threshold number to determine whether to perform a strict or relaxed conformance reviewing process of the application, wherein the conformance reviewing process is a process to determine whether the application meets certain criteria to be approved for use in the network, and wherein the relaxed conformance reviewing process is a process that allows the application to be approved faster than the strict conformance reviewing process by requiring the application to go through less criteria checking steps than the strict conformance reviewing process;
      based on a result of the strict or relaxed conformance reviewing process, provide the approved application for use in the network.

13. The computer system of claim 12, wherein the one or more hardware processors use the instructions to prevent a service that is not one of the network services identified by the developer from being available to the application by (i) preventing function calls for the service from being made to the network computing device, or (ii) preventing the network computing device to respond to the function calls for the service.

14. The computer system of claim 12, wherein the set of services includes at least one of email service, personalization service, externally hosted content, or transaction service.

15. The computer system of claim 12, wherein the set of services includes at least one of a print capability, a scanner capability, facsimile capability, memory storage, ink level information, cartridge information, scheduled printing capability, or security service.

* * * * *